(12) United States Patent
Jung

(10) Patent No.: US 11,372,140 B2
(45) Date of Patent: Jun. 28, 2022

(54) LIQUID LENS, CAMERA MODULE, AND OPTICAL DEVICE INCLUDING THE SAME

(71) Applicants: LG INNOTEK CO., LTD., Seoul (KR); CORNING INCORPORATED, Corning, NY (US)

(72) Inventor: Ji Young Jung, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/057,551

(22) PCT Filed: May 23, 2019

(86) PCT No.: PCT/KR2019/006202
§ 371 (c)(1),
(2) Date: Nov. 20, 2020

(87) PCT Pub. No.: WO2019/225984
PCT Pub. Date: Nov. 28, 2019

(65) Prior Publication Data
US 2021/0199858 A1 Jul. 1, 2021

(30) Foreign Application Priority Data
May 23, 2018 (KR) ........................ 10-2018-0058366

(51) Int. Cl.
*G02B 3/14* (2006.01)
*H04N 5/225* (2006.01)
(Continued)

(52) U.S. Cl.
CPC .............. *G02B 3/14* (2013.01); *G02B 7/021* (2013.01); *G03B 30/00* (2021.01); *H04N 5/2254* (2013.01); *H04N 5/22525* (2018.08)

(58) Field of Classification Search
CPC .......... G02B 3/14; G02B 7/021; G03B 17/12; G03B 30/00; H04N 5/22525; H04N 5/2254; H04N 5/2257
See application file for complete search history.

(56) References Cited

U.S. PATENT DOCUMENTS 7,043,153 B2 5/2006 Takeyama et al.
7,782,541 B2 8/2010 Oh et al.
(Continued)

FOREIGN PATENT DOCUMENTS

CN 102053344 A 5/2011
CN 105319665 A 2/2016
(Continued)

OTHER PUBLICATIONS

Berry et al., "Fluidic microoptics with adjustable focusing and beam steering for single cell optogenetics," Optics Express, vol. 25. No. 14, 2017, pp. 16825-16839, 15 pages total.

*Primary Examiner* — Chiawei Chen
(74) *Attorney, Agent, or Firm* — Birch, Stewart, Kolasch & Birch, LLP

(57) ABSTRACT

A liquid lens includes a first plate in which a cavity accommodating a first liquid and a second liquid is formed, the first liquid being conductive and the second liquid being non-conductive; a first electrode disposed on the first plate; a second electrode disposed under the first plate; a second plate disposed on the first electrode; and a third plate disposed under the second electrode, wherein an opening formed in the cavity adjacent to the second plate has a diameter of 1.6 mm to 1.9 mm, and wherein the first plate has a thickness of 0.45 mm to 0.55 mm.

6 Claims, 9 Drawing Sheets

(51) Int. Cl.
*G03B 30/00* (2021.01)
*G02B 7/02* (2021.01)

(56) References Cited

U.S. PATENT DOCUMENTS

| | | |
|---|---|---|
| 2008/0231965 A1 | 9/2008 | Weekamp |
| 2008/0231966 A1 | 9/2008 | Hendriks et al. |
| 2008/0267603 A1 | 10/2008 | Jung et al. |
| 2009/0021823 A1* | 1/2009 | Heim ............... G02B 3/14 359/290 |
| 2009/0190232 A1* | 7/2009 | Craen ............... G02B 3/14 359/666 |
| 2010/0202054 A1 | 8/2010 | Niederer |
| 2011/0085070 A1 | 4/2011 | Kang et al. |
| 2012/0037820 A1* | 2/2012 | Komi ............... G03B 17/14 250/566 |
| 2012/0113525 A1* | 5/2012 | Kong ............... G02B 3/14 359/665 |
| 2017/0315274 A1 | 11/2017 | Park et al. |
| 2018/0095194 A1* | 4/2018 | Park ............... G02B 26/004 |

FOREIGN PATENT DOCUMENTS

| | | |
|---|---|---|
| JP | 2004-341032 A | 12/2004 |
| JP | 2007-183635 A | 7/2007 |
| JP | 2007-519971 A | 7/2007 |
| JP | 2007-519973 A | 7/2007 |
| JP | 2010-532492 A | 10/2010 |
| KR | 10-2006-0129321 A | 12/2006 |
| KR | 10-0843473 B1 | 7/2008 |
| KR | 10-2010-0040316 A | 4/2010 |
| KR | 10-1805128 B1 | 12/2017 |
| WO | WO 2017/188798 A1 | 11/2017 |
| WO | WO 2018/044131 A1 | 3/2018 |

* cited by examiner

【FIG. 1】
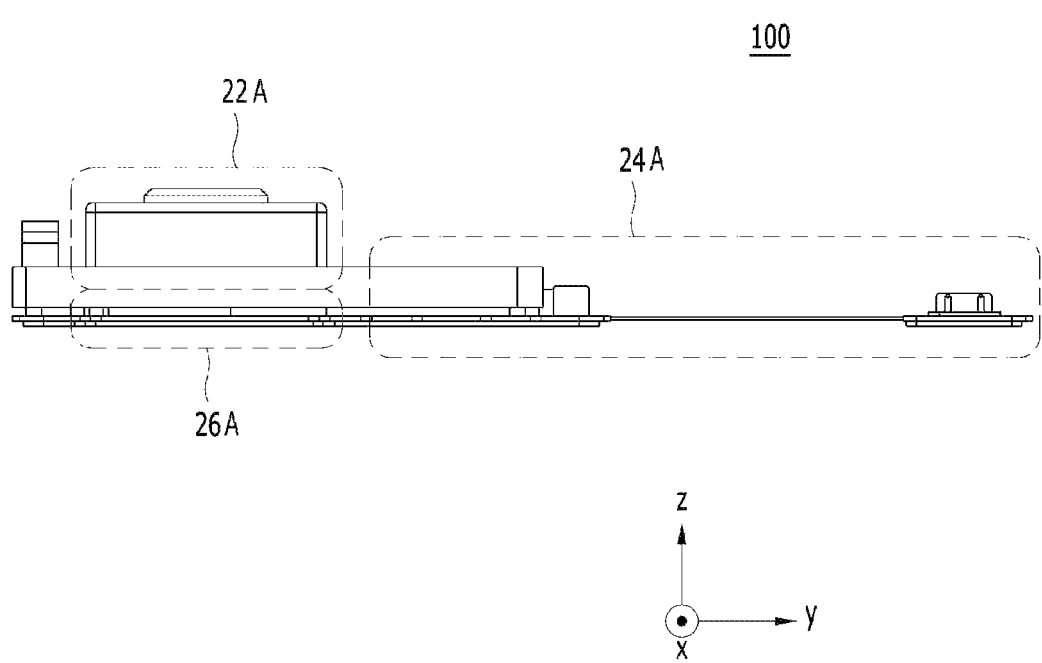

[FIG. 2]
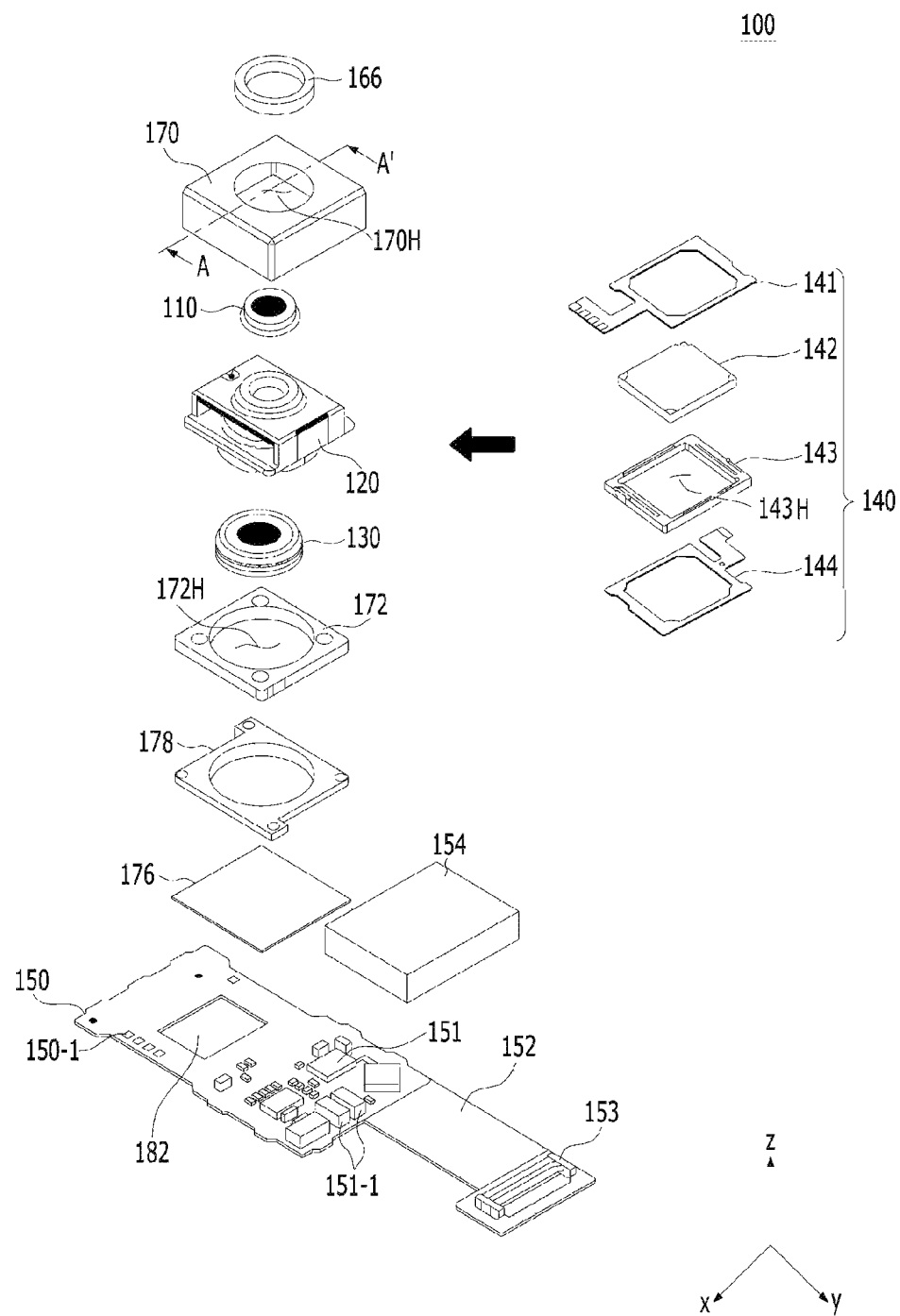

[FIG. 3]
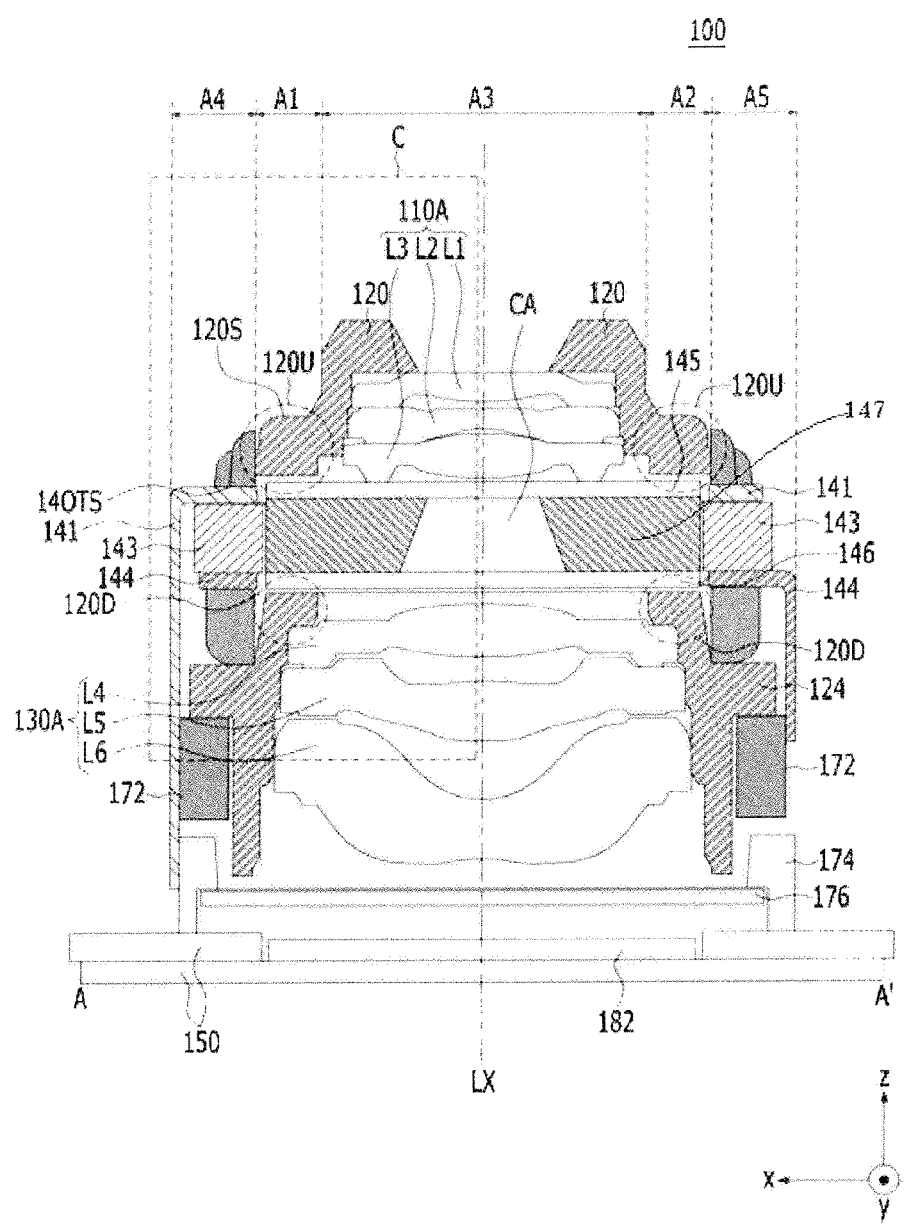

[FIG. 4]
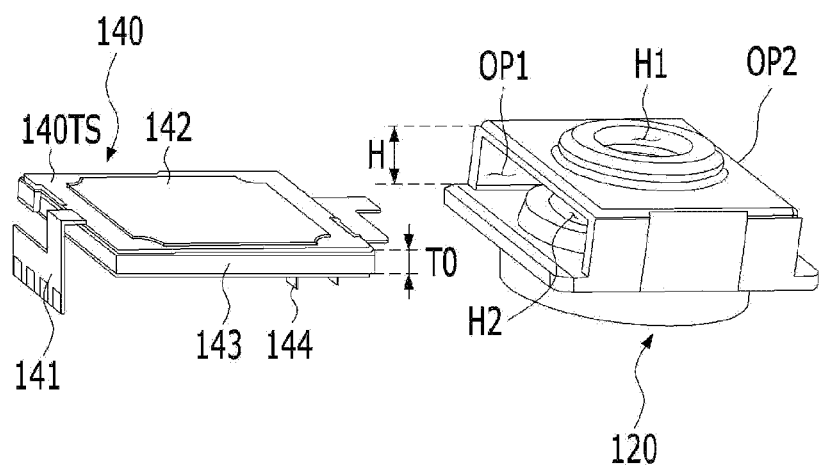

[FIG. 5a]
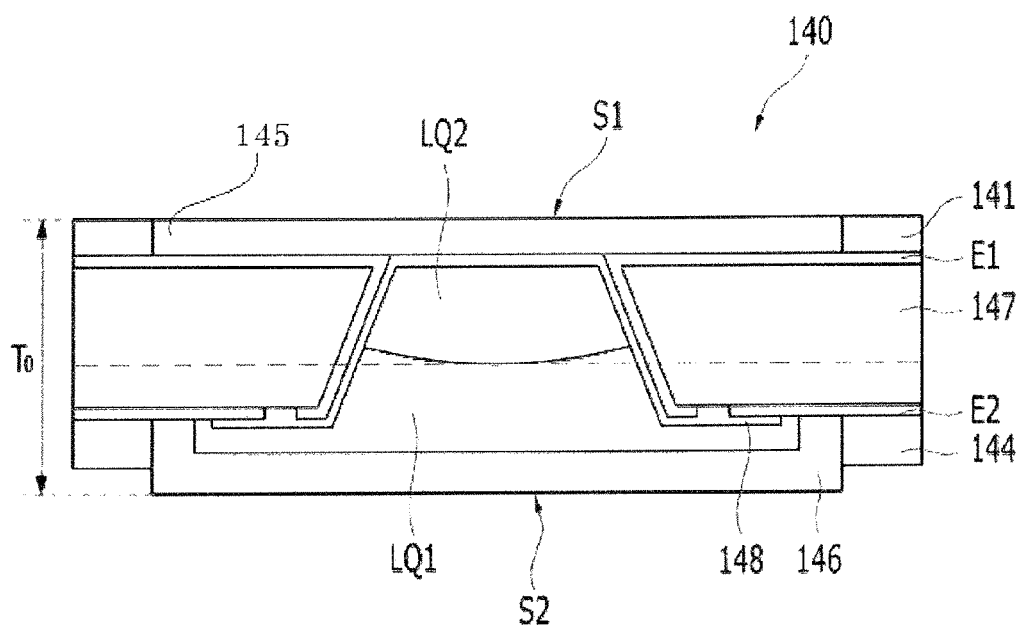

[FIG. 5b]
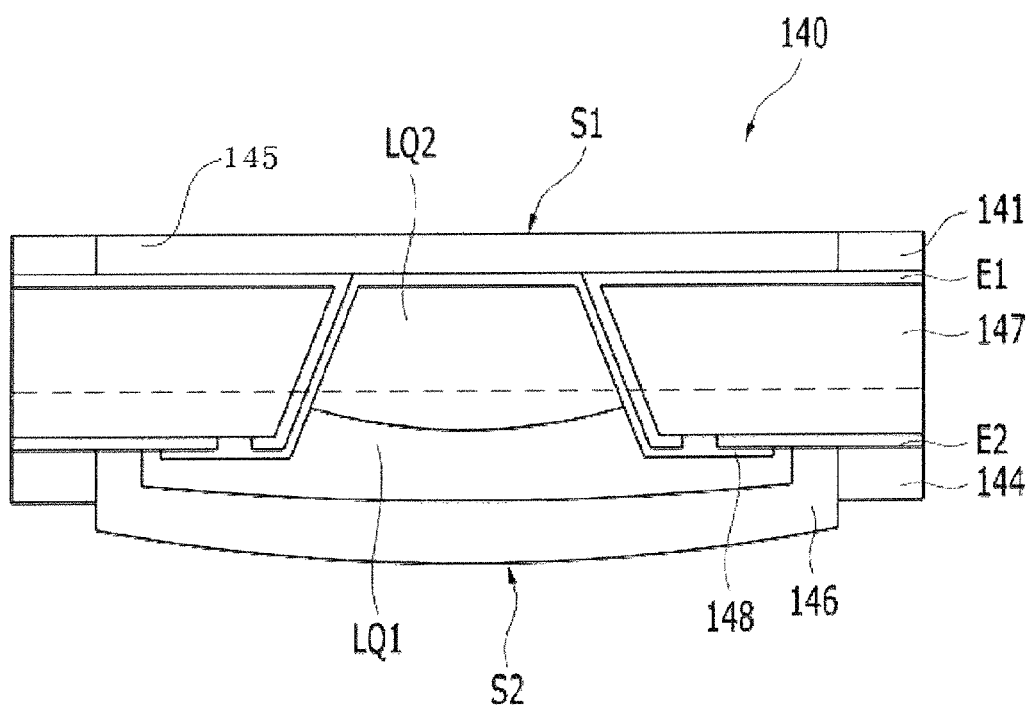

[FIG. 6]
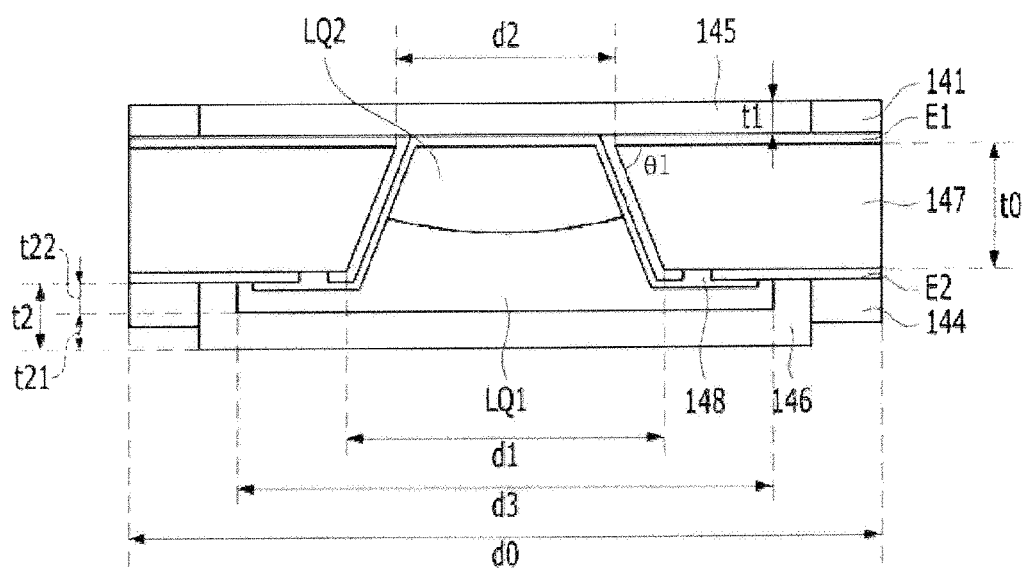

[FIG. 7]
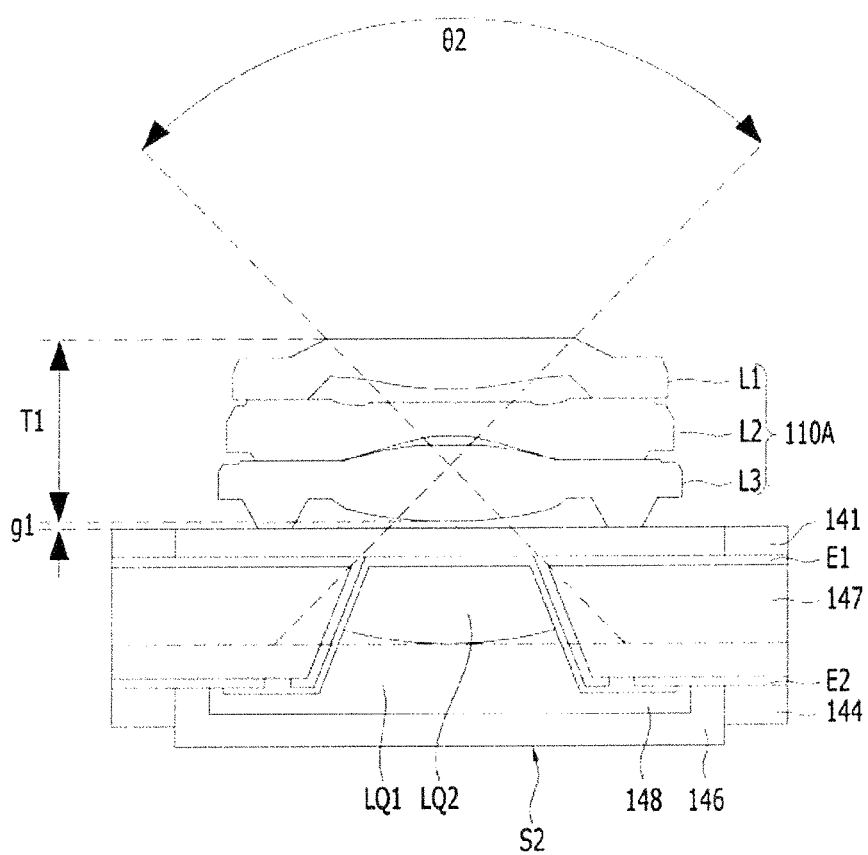

[FIG. 8]
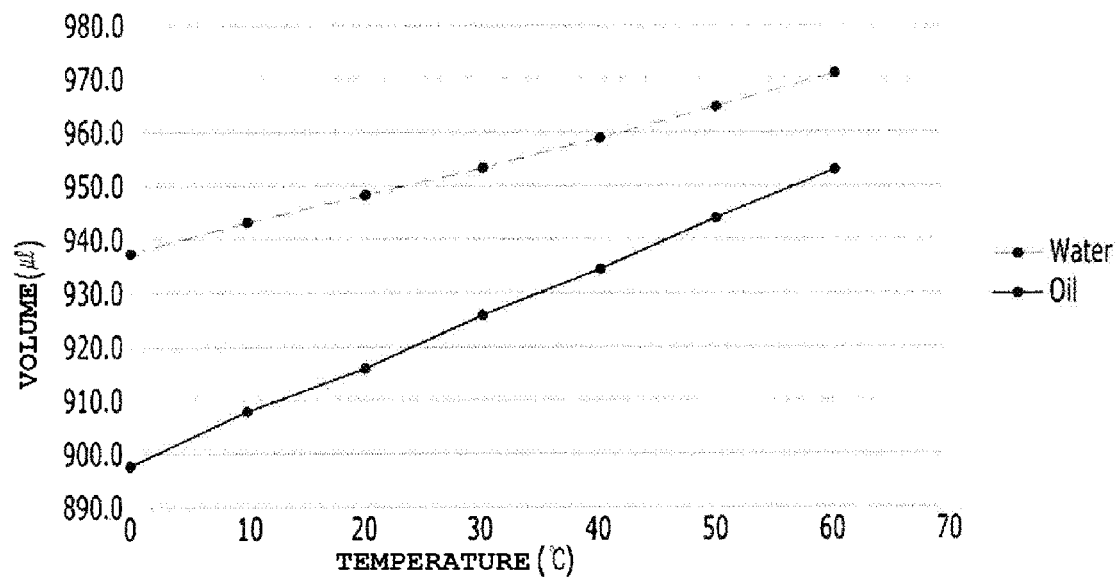
[FIG. 9]
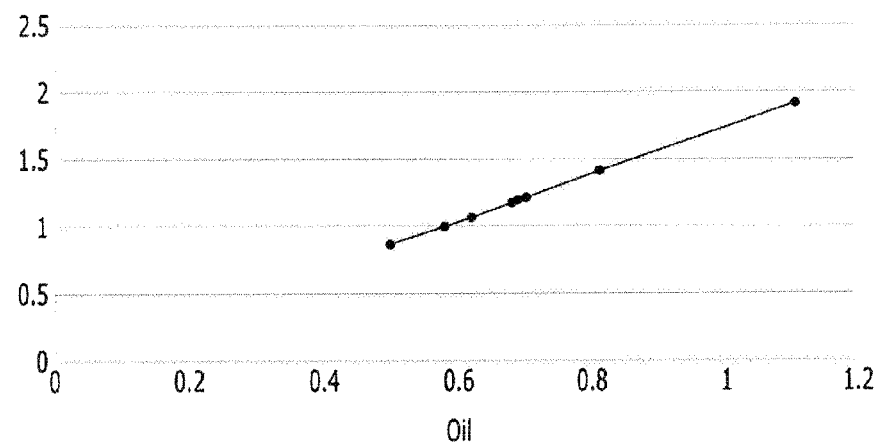

LIQUID LENS, CAMERA MODULE, AND OPTICAL DEVICE INCLUDING THE SAME

CROSS REFERENCE TO RELATED APPLICATIONS

This application is the National Phase of PCT International Application No. PCT/KR2019/006202, filed on May 23, 2019, which claims priority under 35 U.S.C. 119(a) to Patent Application No. 10-2018-0058366, filed in the Republic of Korea on May 23, 2018, all of which are hereby expressly incorporated by reference into the present application.

TECHNICAL FIELD

Embodiments relate to a liquid lens, a camera module, and an optical device including the same.

BACKGROUND ART

People who use portable devices demand optical devices that have high resolution, are small, and have various photographing functions. For example, the various photographing functions may include at least one of an optical zoom-in/zoom-out function, an auto-focusing (AF) function, or a hand-tremor compensation or optical image stabilizer (OIS) function.

Conventionally, in order to realize the aforementioned various photographing functions, a method of combining a plurality of lenses and directly moving the combined lenses is used. In the case in which the number of lenses is increased, however, the size of an optical device may be increased.

The auto-focusing function and the hand-tremor compensation function are performed by moving or tilting several lenses, which are fixed to a lens holder and are aligned with an optical axis, along the optical axis or in a direction perpendicular to the optical axis. To this end, a separate lens-moving apparatus is required to move a lens assembly composed of a plurality of lenses. However, the lens-moving apparatus consumes a lot of power, and a cover glass needs to be provided separately from a camera module in order to protect the lens-moving apparatus, thus leading to an increase in the overall size of the conventional camera module. In order to solve this problem, research has been conducted on a liquid lens configured to electrically adjust the curvature of an interface between two types of liquids in order to perform the auto-focusing function and the hand-tremor compensation function.

In a liquid lens, two types of liquids may change in volume depending on temperature, and if the curvature of a plate changes on the surface of the liquid lens depending on a change in the volume of the liquids, the diopter of the light passing through the liquid lens may also change.

The aforementioned variation in the diopter of a liquid lens depending on a change in temperature may deteriorate the optical performance of a liquid lens, a camera module including the same, and an optical device.

DISCLOSURE

Technical Problem

An object of the embodiments is to prevent deterioration in the optical performance of a liquid lens depending on a change in the temperature inside a liquid lens, a camera module including the same, and an optical device.

Technical Solution

A liquid lens according to an embodiment may include a first plate in which a cavity accommodating a first liquid and a second liquid is formed, the first liquid being conductive and the second liquid being non-conductive, a first electrode disposed on the first plate, a second electrode disposed under the first plate, a second plate disposed on the first electrode, and a third plate disposed under the second electrode. An opening formed in the cavity adjacent to the second plate may have a diameter of 1.6 mm to 1.9 mm, and the first plate may have a thickness of 0.45 mm to 0.55 mm.

For example, the ratio of the thickness to the diameter of the opening may exceed 0.3.

For example, the first liquid may have a volume of 2 µℓ to 2.4 µℓ, and the second liquid may have a volume of 0.8 µℓ to 1 µℓ.

For example, the ratio of the volume of the first liquid to the volume of the second liquid may be 2 to 3.

A camera module according to another embodiment may include a holder including one sidewall having a first opening and another sidewall having a second opening facing the first opening in a direction perpendicular to an optical-axis direction, and the above-described liquid lens, at least a portion of which is disposed in the first opening and the second opening.

For example, the camera module may include a liquid lens unit having the liquid lens and an adhesive member coupling the holder and the liquid lens unit.

For example, the camera module may further include a first lens unit disposed inside the holder and disposed above the liquid lens and a second lens unit disposed below the liquid lens, and the first lens unit may include three plastic lenses.

For example, the first lens unit may have a thickness of 1.1 mm to 1.4 mm.

For example, the gap between the liquid lens and the first lens unit on an optical axis may be 0.1 mm to 0.3 mm.

An optical device according to still another embodiment may include the camera module, an image sensor configured to convert an image introduced through the camera module into an electrical signal, and a display module including a plurality of pixels configured to change in color in response to the electrical signal.

Advantageous Effects

A liquid lens, a camera module including the same, and an optical device according to embodiments are capable of reducing variation in the diopter of the liquid lens, of more efficiently achieving hand-tremor compensation, and of securing a light incidence diameter even when the volumes of a first liquid and a second liquid are reduced due to a change in temperature.

DESCRIPTION OF DRAWINGS

FIG. 1 illustrates a schematic side view of a camera module according to an embodiment.

FIG. 2 illustrates an exploded perspective view of an embodiment of the camera module shown in FIG. 1.

FIG. 3 illustrates a cross-sectional view of the camera module shown in FIG. 2.

FIG. 4 is a view for explaining the holder and the liquid lens unit shown in FIGS. 2 and 3.

FIGS. 5A and 5B are views showing the shapes of the liquid lens unit.

FIG. 6 is a view showing the structure of a liquid lens unit according to an embodiment.

FIG. 7 is a view showing the arrangement of the liquid lens unit and the first lens unit shown in FIG. 6.

FIG. 8 is a view showing variation in the volume of a first liquid and a second liquid depending on temperature.

FIG. 9 is a view showing the volume and thermal expansion of the second liquid.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid lens, a lens assembly including the liquid lens, and a camera module including the assembly according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 4.

FIG. 1 illustrates a schematic side view of the camera module 100 according to an embodiment.

Referring to FIG. 1, the camera module 100 may include a lens assembly 22A, a control circuit 24A, and an image sensor 26A.

First, the lens assembly 22A may include a plurality of lens units and a holder in which the plurality of lens units is accommodated. As will be described below, the plurality of lens units may include a liquid lens unit, and may further include a first lens unit or a second lens unit. The plurality of lens units may include first and second lens units and a liquid lens unit.

The control circuit 24A serves to supply a driving voltage (or operation voltage) to the liquid lens (unit).

The control circuit 24A and the image sensor 26A described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24A may be designed in different ways depending on the specifications required in the optical device. In particular, the control circuit 24A may be implemented as a single chip so as to reduce the magnitude of the driving voltage applied to the lens assembly 22A. Thereby, the size of an optical device mounted in a portable device may be further reduced.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include at least one adhesive member. The at least one adhesive member serves to couple or fix a liquid lens unit 140 to a holder 120. In addition, the camera module 100 may further include a sensor base 178 and a filter 176. In addition, the camera module 100 may further include a circuit cover 154. The circuit cover 154 may have an electromagnetic shielding function.

According to the embodiment, at least one of the components of the camera module 100 shown in FIG. 2 may be omitted. Alternatively, at least one component different from the components shown in FIG. 2 may be further included in the camera module 100.

FIG. 3 is a cross-sectional view of the camera module 100 shown in FIG. 2. That is, FIG. 3 is a cross-sectional view taken along line A-A' in the camera module 100 shown in FIG. 2. For convenience of description, the first cover 170, the circuit cover 154, and the connector 153 shown in FIG. 2 are not illustrated in FIG. 3, and may in practice be omitted from the camera module 100.

Referring to FIGS. 2 and 3, the lens assembly may include at least one of the liquid lens unit 140, the holder 120, a first lens unit 110 or 110A, or a second lens unit 130 or 130A, and may correspond to the lens assembly 22A shown in FIG. 1. The lens assembly may be disposed on the main board 150.

In the lens assembly, the first lens unit 110 or 110A and the second lens unit 130 or 130A may be referred to as a 'first solid lens unit' and a 'second solid lens unit', respectively, in order to be distinguished from the liquid lens unit 140.

The first lens unit 110 or 110A may be disposed at the upper side of the lens assembly, and may be a region on which light is incident from outside the lens assembly. That is, the first lens unit 110 or 110A may be disposed above the liquid lens unit 140 within the holder 120. The first lens unit 110 or 110A may be implemented using a single lens, or may be implemented using two or more lenses that are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100, or may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned along the optical axis LX through active alignment (AA).

Here, active alignment may mean an operation of aligning the optical axes of the first lens unit 110 or 110A, the second lens unit 130 or 130A, and the liquid lens unit 140 with each other and adjusting an axial relationship or distance relationship between the image sensor 182 and the lens units 110 or 110A, 130 or 130A, and 140 in order to acquire an improved image.

In an embodiment, active alignment may be performed through an operation of analyzing image data generated by the image sensor 182, which receives light introduced from a specific object via at least one of the first lens unit 110 or 110A, the second lens unit 130 or 130A, or the liquid lens unit 140. For example, active alignment may be performed in the following sequence.

In one example, after active alignment (first alignment), which adjusts relative positions between the first lens unit 110 or 110A and the second lens unit 130 or 130A, which are fixedly mounted to the holder 120, and the image sensor 182, is completed, active alignment (second alignment), which adjusts relative positions between the liquid lens unit 140, which is inserted into the holder 120, and the image sensor 182, may be performed. The first alignment may be performed as a gripper grips the middle base 172 and displaces the middle base 172 to various positions, and the second alignment may be performed as the gripper grips a spacer 143 of the liquid lens unit 140 and displaces the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, when the protruding portion 124 has a small thickness, active alignment may not be accurately performed. In order to prevent this, the camera module 100 may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other using an adhesive member, for example, epoxy.

In another example, after active alignment (third alignment), which adjusts relative positions between the first lens unit 110 or 110A, the second lens unit 130 or 130A, and the liquid lens unit 140, which are fixedly mounted to the holder 120, is completed, active alignment (fourth alignment), which adjusts relative positions between the lenses of the lens assembly, which have completely undergone the third alignment, and the image sensor 182 may be performed. The third alignment may be performed as a gripper grips the spacer 143 of the liquid lens unit 140 and displaces the spacer to various positions, and the fourth alignment may be performed as the gripper grips the middle base 172 and displaces the middle base to various positions.

In addition, as illustrated in FIG. 3, the first lens unit 110A may include, for example, three lenses L1, L2 and L3, but this is merely given by way of example, and the first lens unit 110A may include one lens, or three or more lenses.

In addition, an exposure lens may be disposed at the upper side of the first lens unit 110 or 110A. Here, the exposure lens may be the outermost lens among the lenses included in the first lens unit 110 or 110A. That is, the lens L1 located at the uppermost side of the first lens unit 110A may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameter of each of the lenses L1, L2 and L3 included in the first lens unit 110A may gradually increase in a direction approaching the bottom (e.g. in the −z-axis direction), but the embodiment is not limited thereto.

FIG. 4 is a view for explaining the holder 120 and the liquid lens unit 140 shown in FIGS. 2 and 3. That is, FIG. 4 illustrates an exploded perspective view of the holder 120 and the liquid lens unit 140. The holder 120 shown in FIG. 4 may include first and second holes H1 and H2 and first to fourth sidewalls.

FIG. 2 illustrates a plan view of the state before a first connection substrate 141 and a second connection substrate 144 are bent in the −z-axis direction, and FIG. 4 illustrates the state after the first connection substrate 141 is bent in the −z-axis direction. Further, as shown in FIG. 3, the spacer 143 may be disposed between the first connection substrate 141 and the second connection substrate 144, and may be disposed so as to protrude from at least one of a first or second opening OP1 or OP2 in the holder 120.

In addition, the spacer 143 may be disposed so as to surround the side surface of the liquid lens 142 in a ring shape. The spacer 143 may include, at the upper portion and the lower portion thereof, uneven portions in order to increase coupling force with the connection substrates 141 and 144 using an adhesive material. The connection substrates 141 and 144 may have a shape corresponding to the shape of the spacer 143, and may include a ring shape.

The first and second holes H1 and H2 may be formed respectively in the upper portion and the lower portion of the holder 120 to open the upper portion and the lower portion of the holder 120, respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, as illustrated in FIG. 4, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness T0 of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. in the z-axis direction).

The light introduced into the first lens unit 110 or 110A from outside the camera module 100 may pass through the liquid lens unit 140 and may be introduced into the second lens unit 130 or 130A. The second lens unit 130 or 130A may be implemented using a single lens, or may be implemented using two or more lenses, which are aligned along the center axis to form an optical system. For example, as illustrated in FIG. 3, the second lens unit 130A may include three lenses L4, L5 and L6, but this is merely given by way of example, and two fewer lenses or four or more lenses may be included in the second lens unit 130 or 130A.

In addition, the outer diameter of each of the lenses L4, L5 and L6 included in the second lens unit 130A may gradually increase in a direction approaching the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

In addition, referring to FIG. 3, the liquid lens unit 140 may include first to fifth areas A1, A2, A3, A4 and A5.

The first area A1 is an area disposed inside the first opening OP1 in the holder 120, the second area A2 is an area disposed inside the second opening OP2 in the holder 120, and the third area A3 is an area between the first area A1 and the second area A2. The fourth area A4 is an area protruding from the first opening OP1 in the holder 120 and disposed outside the holder 120 at the side of the first opening OP1. The fifth area A5 is an area protruding from the second opening OP2 in the holder 120 and disposed outside the holder 120 at the side of the second opening OP2.

The first connection substrate 141 may electrically connect a plurality of first electrodes (not shown) included in the liquid lens unit 140 to the main board 150. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not shown) to the main board 150. The second connection substrate 144 may be implemented as an FPCB or a single metal substrate (a conductive metal plate).

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The liquid lens 142 may include a cavity CA. As shown in FIG. 3, the open area in the direction in which light is introduced into the cavity CA may be smaller than the open area in the opposite direction. Alternatively, the liquid lens 142 may be disposed such that the direction of inclination of the cavity CA is opposite what is illustrated. That is, unlike the illustration of FIG. 3, the open area in the direction in which light is introduced into the cavity CA may be greater than the open area in the opposite direction. In addition, when the liquid lens 142 is disposed such that the direction of inclination of the cavity CA is opposite what is illustrated, the arrangement of all or some of the components included in the liquid lens unit 140 may be changed, or only the direction of inclination of the cavity CA may be changed and the arrangement of the remaining components may not be changed, according to the direction of inclination of the liquid lens unit 142.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

For example, the spacer 143 may include a hollow region 143H in which the liquid lens 142 is accommodated, and a frame configured to surround the hollow region 143H formed in the center thereof. As such, the spacer 143 may have a centrally-hollowed square planar shape (hereinafter referred to as a '☐'-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction is greater than the length of the holder 120 in the x-axis direction. Thus, portions of the spacer 143, which protrude from the first and second sidewalls, may respectively correspond to the fourth area A4 and the fifth area A5 shown in FIG. 3.

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3, the spacer 143 is illustrated as not being disposed in the first opening OP1 and the second opening OP2. However, unlike the illustration, as illustrated in FIGS. 2 and 4, it can be seen that at least a portion of the spacer 143 may be disposed in each of the first and second openings OP1 and OP2 since the spacer 143 has a '☐'-shaped form and surrounds the liquid lens 142.

In addition, at least a portion of the liquid lens 142 may be disposed in at least one of the first opening OP1 or the second opening OP2. Referring to FIG. 3, it can be seen that a first plate 147, which is a component of the liquid lens 142, is disposed in each of the first and second openings OP1 and OP2.

In addition, only at least a portion of the spacer 143 may be disposed in each of the first and second openings OP1 and OP2, and the liquid lens 142 may not be disposed therein.

In addition, referring to FIG. 3, the holder 120 may include a holder upper area 120U disposed above the liquid lens unit 140 and a holder lower area 120D disposed below the liquid lens unit 140. In this case, each of the first and second adhesive members may couple each of the holder upper area 120U and the holder lower area 120D to the liquid lens unit 140.

The first cover 170 may be disposed so as to surround the holder 120, the liquid lens 142, and the middle base 172, and may protect these components 120, 142 and 172 from external impacts. In particular, since the first cover 170 is disposed, a plurality of lenses, which forms an optical system, may be protected from external impacts.

In addition, in order to allow the first lens unit 110 or 110A disposed in the holder 120 to be exposed to external light, the first cover 170 may include an upper opening 170H formed in the upper surface of the first cover 170.

In addition, a window formed of a light-transmitting material may be disposed in the upper opening 170H, whereby it is possible to prevent foreign substances such as dust or moisture from entering the camera module 100.

In addition, the first cover 170 may be disposed so as to cover the upper surface and the first to fourth sidewalls of the holder 120.

Meanwhile, referring to FIGS. 2 and 3, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, each of the accommodating hole 172H in the middle base 172 and the second hole H2 is illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100.

The middle base 172 may be mounted on the main board 150 so as to be spaced apart from a circuit element 151 on the main board 150. That is, the holder 120 may be disposed on the main board 150 so as to be spaced apart from the circuit element 151.

The main board 150 may be disposed below the middle base 172, and may include a recess in which the image sensor 182 may be mounted, seated, tightly disposed, fixed, provisionally fixed, supported, coupled, or accommodated, the circuit element 151, a connection part (or an FPCB) 152, and a connector 153.

The circuit element 151 of the main board 150 may constitute a control module, which controls the liquid lens unit 140 and the image sensor 182. The circuit element 151 may include at least one of a passive element or an active element, and may have any of various areas and heights. The circuit element 151 may be provided in a plural number, and may have a height greater than the height of the main board 150 so as to protrude outwards. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area in which the holder 120 is disposed and an element area in which the plurality of circuit elements 151 is disposed.

The main board 150 may be implemented as a rigid flexible printed circuit board (RFPCB) including the FPCB 152. The FPCB 152 may be subjected to bending depending on the requirements of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data (or electrical signal). More specifically, the image sensor 182 may generate image data by converting light into analog signals via a pixel array including a plurality of pixels and synthesizing digital signals corresponding to the analog signals.

Meanwhile, the connector 153 may electrically connect the main board 150 to a power supply or some other devices (e.g. an application processor) outside the camera module 100.

Meanwhile, some of the plurality of circuit elements 151 shown in FIG. 2 may cause electromagnetic interference (EMI) or noise. In particular, among the plurality of circuit elements 151, a power inductor 151-1 may cause greater EMI than other elements. In order to block EMI or noise, the circuit cover 154 may be disposed so as to cover the circuit elements 151 disposed in the element area of the main board 150.

In addition, when the circuit cover 154 is disposed so as to cover the circuit elements 151, the circuit elements 151 disposed on the main board 150 may be protected from external impacts. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, among the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts.

The main board 150 may be disposed below the sensor base 178, the sensor base 178 may be mounted on the main board 150 so as to be spaced apart from the circuit elements 151, and the holder 120 in which the middle base 172, the second lens unit 130 or 130A, the liquid lens unit 140, and the first lens unit 110 or 110A are disposed may be disposed above the sensor base 178.

FIGS. 5A and 5B are views showing the shapes of the liquid lens.

The liquid lens unit 140 may include a liquid lens 142, a spacer 143, and first and second connection substrates 141 and 144.

The liquid lens 142 may include a plurality of different types of liquids LQ1 and LQ2, first to third plates 147, 145 and 146, first and second electrodes E1 and E2, and an insulation layer 148.

The liquids LQ1 and LQ2 may be accommodated in the cavity CA formed in the first plate 147, and may include a first liquid LQ1, which is conductive, and a second liquid (or an insulative liquid) LQ2, which is non-conductive. The first liquid LQ1 and the second liquid LQ2 may be immiscible with each other, and an interface may be formed at the contact portion between the first and second liquids LQ1 and LQ2. For example, the second liquid LQ2 may be disposed on the first liquid LQ1, but the embodiment is not limited thereto.

The first liquid LQ1 may be water, or may be formed of a mixture of ethylene glycol and sodium bromide (NaBr), and the second liquid LQ2 may include oil.

Each of the first liquid LQ1 and the second liquid LQ2 may include at least one of a sterilizer or an antioxidant. The sterilizer may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to prevent a change in the physical properties of the first and second liquids LQ1 and LQ2 attributable to oxidation of the first and second liquids LQ1 and LQ2 or propagation of microorganisms.

The inner surface of the first plate 147 may form a sidewall of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146.

The diameter of a wider opening among the third and fourth openings may be changed depending on the field of view (FOV) required for the liquid lens 142 or the role of the liquid lens 142 in the camera module 100. According to the embodiment, the size (the area or the width) of the fourth opening may be greater than the size (the area or the width) of the third opening. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section, and the inclined surface thereof may have an inclination ranging from 55° (degrees) to 65° or an inclination ranging from 50° to 70°. The interface formed by the two liquids LQ1 and LQ2 may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, or may include impurities so that light does not easily pass therethrough.

The electrodes may be disposed respectively on one surface and the other surface of the first plate 147. A plurality of first electrodes E1 may be disposed on one surface (e.g. the upper surface, the side surface, and the lower surface) of the first plate 147 so as to be spaced apart from the second electrode E2. The second electrode E2 may be disposed on at least a portion of the other surface (e.g. the lower surface) of the first plate 147 and may be in direct contact with the first liquid LQ1.

In addition, the first electrodes E1 may be electrodes (hereinafter, referred to as 'individual electrodes'), and the second electrode E2 may be a single electrode (hereinafter, referred to as a 'common electrode'). Here, "n" may be a positive integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity.

In addition, the second plate 145 may be disposed on one surface of the first electrodes E1. That is, the second plate 145 may be disposed above the first plate 147. Specifically, the second plate 145 may be disposed on the upper surface of the first electrodes E1 and the cavity CA.

The third plate 146 may be disposed on one surface of the second electrode E2. That is, the third plate 146 may be disposed below the first plate 147. Specifically, the third plate 146 may be disposed under the lower surface of the second electrode E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 or 110A to travel into the cavity in the first plate 145.

The third plate 146 may be configured to allow the light that has passed through the cavity in the first plate 147 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

The insulation layer 148 may be disposed so as to cover a portion of the lower surface of the second plate 145 in the upper area of the cavity. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover the first electrode E1, the first plate 147, and a portion of the second electrode E2. Thus, contact between the first electrode E1 and the first liquid LQ1 and contact between the first electrode E1 and the second liquid LQ2 may be prevented by the insulation layer 148.

The insulation layer 148 may be formed of, for example, a coating agent such as parylene C, and may further include a white dye. The white dye may increase the rate of reflection of light from the insulation layer 148, which forms the sidewall of the cavity.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1, which is conductive.

At least one substrate, for example, the first connection substrate 141 and the second connection substrate 144, serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface formed in the liquid lens 142 is changed according to the driving voltage. When the deformation or the radius of curvature of the interface is controlled, the lens assembly 110, 120, 130 and 140 including the liquid lens unit 140, the camera module 100, and the optical device may perform an auto-focusing (AF) function and a hand-tremor compensation or optical image stabilizer (OIS) function.

The first connection substrate 141 may transmit four different driving voltages (hereinafter, referred to as 'individual voltages') to the liquid lens 142, and the second connection substrate 144 may transmit one driving voltage (hereinafter, referred to as a 'common voltage') to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

The volumes of the first liquid LQ1 and the second liquid LQ2 may change depending on temperature, and, for example, the volumes may increase upon an increase in temperature. At this time, as shown in FIG. 5B, when the volumes of the first liquid LQ1 and the second liquid LQ2 charged in the cavity CA increase, the third plate 146, particularly the lower surface thereof, may be deformed so as to swell downwards. In order to reduce variation in the diopter of the liquid lens 142 attributable to an increase in the volume of the first liquid LQ1 and the second liquid LQ2, it may be preferable to use smaller amounts of the first liquid LQ1 and second liquid LQ2. It is necessary to reduce the volumes of the first liquid LQ1 and the second liquid LQ2 without deterioration of the optical performance of the liquid lens 142 in any other respect.

To this end, it is necessary to change the structure of the liquid lens 142 while changing the items shown in Table 1 below. The items shown in Table 1 may be shown in the liquid lens of FIG. 6.

FIG. 6 is a view showing the structure of a liquid lens unit according to an embodiment.

The liquid lens unit shown in FIG. 6 may be the same as the liquid lens unit 140 shown in FIG. 5A. The thickness of the first plate 147 may be t0, the thickness of the second plate 145 may be t1, and the thickness of the third plate 146 may be t2. The thickness t2 of the portion of the third plate 146, through which light actually passes, may be t21.

In addition, the diameter of the opening that is in contact with the second plate 145 may be d2, and the diameter of the opening that is in contact with the third plate 146 may be d1. In addition, the overall diameter or length of the first plate 147 may be d0, and the diameter or length of the inner surface of the third plate 146 may be d3. In addition, the angle at which the cavity CA is inclined is denoted by 81.

Table 1 shows variation in diopter depending on temperature in Embodiments 1 and 2 of the liquid lens 142, respective items of which have different values from each other.

TABLE 1

| Classification | Embodiment 1 | Embodiment 2 |
|---|---|---|
| t0 (mm) | 0.4370 | 0.5 |
| d2 (mm) | 1.36 | 1.61 |
| Δdpt/° C. | 0.109 | 0.125 |
| Volume of $2^{nd}$ Liquid (µℓ) | 0.5000 | 0.8100 |
| Volume of $1^{st}$ Liquid (µℓ) | 1.7380 | 2.122 |
| t0/d2 | 0.32 | 0.31 |

Table 1 shows data obtained by varying t0 and d2 in the state in which θ1 is constant, Δdpt/° C. represents the rate of change in the diopter of the liquid lens 142 depending on a change in temperature, and the volumes of the first liquid LQ1 and LQ2 are expressed in microliters (µℓ). t0/d2 is an OIS-related factor, and when t0/d2 exceeds about 0.30, hand-tremor compensation may be properly performed in a macro state (62.1 diopters).

In Embodiment 1, the OIS-related factor is 0.32, which is greater than 0.30, but d2, i.e. the diameter of the opening through which light enters the liquid lens, is 1.36 mm, which is so small that the quantity of incident light and the field of view may be excessively reduced.

In Embodiment 2, the OIS-related factor is 0.31, and the diameter d2 of the opening through which light enters the liquid lens 142 is 1.61 mm, so the quantity of light and the field of view may be realized within required ranges.

Therefore, in order to secure the field of view of the liquid lens 142, the size d2 of the opening into which light is introduced may be set within the range of 1.60 mm to 1.9 mm. If the size d2 is smaller than 1.61 mm, the quantity of incident light and the field of view may be too small, and if d2 is larger than 1.9 mm, the quantity of incident light and the field of view may increase, but the amounts of first and second liquids may increase, thus failing to solve the problem in which variation in diopter depending on a change in temperature increases.

In the case of Embodiment 2 of the liquid lens 142, Table 1 shows that the thickness t0 of the first plate 147 is 0.5 millimeters (mm), but the thickness t0 of the first plate 147 according to the present disclosure may be 0.45 mm to 0.55 mm. In addition, the diameter d2 of the opening that is in contact with the second plate 145 may be 1.60 mm to 1.9 mm. The angle θ1 at which the inner surface of the cavity CA is inclined may range from 55° to 65°. In addition, the volume of the first liquid LQ1 may be 2 microliters (µℓ) to 2.4 µℓ, e.g. may be 2.122 µℓ, the volume of the second liquid LQ2 may be 0.8 µℓ to 1 µℓ, e.g. may be 0.81 µℓ, and the ratio of the volume of the first liquid LQ1 to the volume of the second liquid LQ2 may be 2 to 3. In addition, variation in diopter depending on a change in temperature may be 0.13 dpt/° C., e.g. may be 0.125 dpt/° C.

FIG. 7 is a view showing the arrangement of the liquid lens unit and the first lens unit shown in FIG. 6.

Referring to FIG. 7, first to third lenses L1 to L3, which constitute the first lens unit 110A, are disposed above the liquid lens unit. Here, the thickness T1 of the first lens unit 110A may be 1.1 mm to 1.4 mm, e.g. may be 1.275 mm, and the gap g1 between the second plate 145 of the liquid lens 142 and the third lens L3 on the optical axis may be 0.1 mm to 0.3 mm, e.g. may be 0.2 mm.

In addition, the field of view θ2 of the first lens unit 110A may be 75 degrees (°) to 80 degrees, e.g. may be 78.95 degrees. Here, the field of view 82 is the angle at which light is introduced into the opening in the upper portion of the first plate 147 of the liquid lens 142 from the opening in the upper surface of the first lens L1.

Table 2 shows variation in the volume of a conductive liquid, which may be used as the first liquid LQ1, and an insulative liquid, which may be used as the second liquid LQ2, depending on temperature.

TABLE 2

| Classification Temperature (° C.) | Conductive Liquid Volume (µℓ = mm³) | Insulative Liquid Volume (µℓ = mm³) |
|---|---|---|
| 0 | 937.4 | 897.8 |
| 10 | 943.4 | 907.7 |
| 20 | 948.4 | 916.3 |

TABLE 2-continued

| Classification Temperature (° C.) | Conductive Liquid Volume (µℓ = mm³) | Insulative Liquid Volume (µℓ = mm³) |
|---|---|---|
| 30 | 953.6 | 925.9 |
| 40 | 959.1 | 934.8 |
| 50 | 964.9 | 944.0 |
| 60 | 971.1 | 953.4 |

FIG. 8 is a view showing variation in the volume of the first liquid LQ1 and the second liquid LQ2 depending on temperature. FIG. 8 illustrates variation in the volume of the first liquid LQ1, which is the conductive liquid shown in Table 2, and the second liquid LQ2, which is the insulative liquid shown in Table 2, depending on temperature, and it can be seen that the rate of expansion of the volume of the second liquid LQ2 is greater than the rate of expansion of the volume of the first liquid LQ1.

FIG. 9 is a view showing the volume and thermal expansion of the second liquid LQ2 under the condition that the temperature of the second liquid LQ2 varies uniformly, in which the horizontal axis represents the volume of the second liquid LQ2 and the vertical axis represents the amount of change in the volume of the second liquid LQ2. It can be seen that the greater the amount of the second liquid LQ2, the greater the volume increase upon an increase in temperature.

TABLE 3

| Classification | Volume of 2$^{nd}$ Liquid (µℓ) | Volume of 1$^{st}$ Liquid (µℓ) | Expansion Rate of 2$^{nd}$ Liquid | Total Volume |
|---|---|---|---|---|
| Embodiment 1 | 0.7 | 2.104 | 1.219287 | 3.323287 |
| Embodiment 2 | 0.5 | 1.738 | 0.870919 | 2.608919 |
| Embodiment 3 | 0.81 | 2.112 | 1.140889 | 3.532889 |
| Embodiment 4 | 0.58 | 2.112 | 1.010266 | 3.122266 |
| Embodiment 5 | 0.62 | 2.017 | 1.07994 | 3.09694 |
| Embodiment 6 | 0.7 | 1.729 | 1.219287 | 2.948287 |
| Embodiment 7 | 0.68 | 1.676 | 1.18445 | 2.86045 |
| Embodiment 8 | 0.69 | 1.349 | 1.201868 | 2.550868 |

Embodiments 2 and 3 in Table 3 are the same as Embodiments 1 and 2 in Table 1, respectively. Table 3 shows the result obtained by measuring the volumes of the second liquid LQ2 and the first liquid LQ1 at 20° C. and calculating the volume expansion rate of the second liquid LQ2 after increasing the temperature to 50° C. For example, Embodiment 3 in Table 3 shows that the volume of the second liquid LQ2 at 50° C. is 1.140889 times as large as the volume of the second liquid LQ2 at 20° C. In addition, the total volume represents the total volume of the first liquid LQ1 and the second liquid LQ2 at 50° C.

An optical device (or an optical instrument) including the camera module according to the embodiment described above may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments of the present disclosure may be applied to optical devices that may include a liquid lens. In addition, the optical device may be implemented in a portable device such as, for example, a smartphone, a laptop computer, or a tablet computer. Such an optical device may include a camera module, a display unit (or display module) configured to output an image, and a body housing in which the camera module and the display unit are mounted. The display module may include a plurality of pixels, the color of which varies in response to electrical signals generated in an image sensor. A communication module capable of communicating with other devices may be mounted in the body housing of the optical device, and the optical device may further include a memory unit capable of storing data.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

MODE FOR INVENTION

Various embodiments have been described in the best mode for carrying out the disclosure.

INDUSTRIAL APPLICABILITY

A liquid lens, a camera module including the same, and an optical device according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A liquid lens, comprising:
a first plate in which a cavity accommodating a first liquid and a second liquid is formed, the first liquid being conductive and the second liquid being non-conductive;
a first electrode disposed on the first plate;
a second electrode disposed under the first plate;
a second plate disposed on the first electrode; and
a third plate disposed under the second electrode,
wherein an opening formed in the cavity adjacent to the second plate has a diameter of 1.6 mm to 1.9 mm, and
wherein the first plate has a thickness of 0.45 mm to 0.55 mm.

2. A camera module, comprising:
a holder comprising one sidewall having a first opening and another sidewall having a second opening facing the first opening in a direction perpendicular to an optical-axis direction;
the liquid lens according to claim 1, at least a portion of the liquid lens being disposed in the first opening and the second opening; and
an adhesive member coupling the holder and the liquid lens unit.

3. The camera module according to claim 2, further comprising:
a first lens unit disposed inside the holder, the first lens unit being disposed with being adjacent to the second plate of the liquid lens; and
a second lens unit disposed adjacent to the third plate,
wherein the first lens unit comprises three plastic lenses.

4. The camera module according to claim 2, wherein the first lens unit has a thickness of 1.1 mm to 1.4 mm.

5. The camera module according to claim 2, wherein a gap between the liquid lens and the first lens unit on an optical axis is 0.1 mm to 0.3 mm.

6. An optical device, comprising:
- the camera module according to claim 2;
- a controller configured to convert an image introduced through the camera module into an electrical signal; and
- a display module comprising a plurality of pixels configured to change in color in response to the electrical signal.

\* \* \* \* \*